Sept. 11, 1962 R. J. LAHTI 3,053,555
HANDLE ATTACHING KIT
Filed Oct. 31, 1961
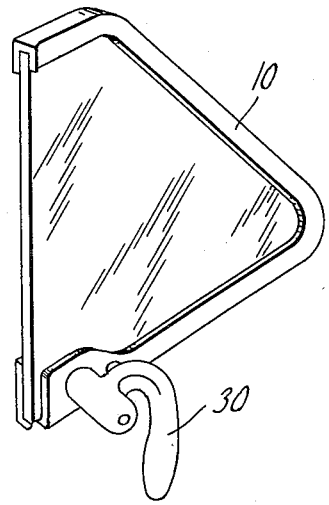
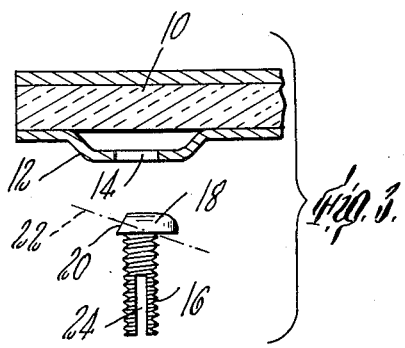
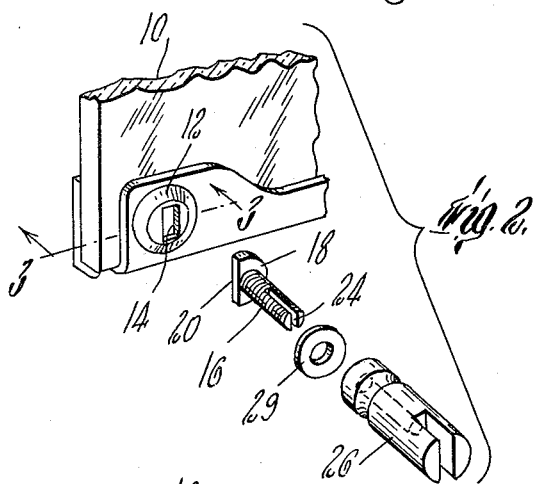
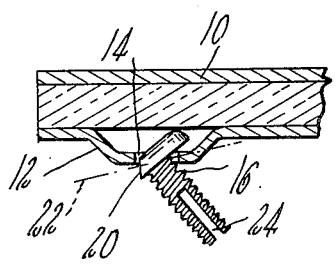
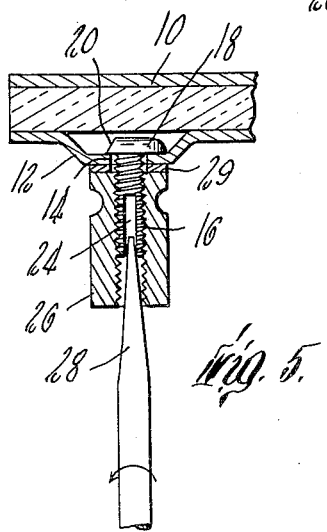

3,053,555
HANDLE ATTACHING KIT
Rudolph J. Lahti, Gloucester, Mass., assignor to Kwik Vent Corporation, Arlington, Mass., a corporation of Massachusetts
Filed Oct. 31, 1961, Ser. No. 149,073
2 Claims. (Cl. 287—20)

The present invention relates to a handle attaching kit for the replacement of fixtures of the general type which comprises a supporting bolt having an enlarged head riveted or otherwise held within a shallow slotted aperture provided in an overlying raised plate secured to the basic part.

The invention is more particularly concerned with the provision of a replacement handle attaching kit for a vertically pivoted window wing panel of an automobile.

In the event the original handle for the panel is broken or missing, it is normally necessary because the manufacturing methods employed preclude part replacements to order from the factory an entirely new panel unit.

It is an object of the invention to provide a handle attaching kit including a bolt having a holding flange shaped to be fitted readily within the aperture originally provided in a window wing panel for the handle fixture together with a post in the form of a sleeve nut, said bolt and post to be secured in a predetermined upright and angularly adjusted position to receive a panel locking and control handle thereon.

With this and other objects in view as may hereinafter appear, the several features of the invention will be readily understood from the following description taken in connection with the accompanying drawings in which:

FIG. 1 is a perspective view of an automobile window panel with the locking handle in place;

FIG. 2 is an exploded view in perspective showing a portion of the panel, the rectangularly slotted aperture therein, the flanged bolt and a sleeve nut adapted to be threaded thereto;

FIG. 3 is an enlarged fragmentary sectional plan view of the panel including the rectangularly slotted aperture shown in FIG. 2, further illustrating the flanged bolt associated therewith;

FIG. 4 is a view similar to FIG. 3 but with the flanged bolt shown in a position taken during installation of the bolt in the slotted aperture; and FIG. 5 is a sectional plan view of the assembled handle supporting post including the flanged bolt and tightening sleeve nut, demonstrating the manner in which a screw driver is employed for tightening the assembly.

Referring to the drawings, an automobile window panel 10 adapted to turn on a vertical axis is shown having a blown up portion 12, which has formed therein a rectangularly slotted aperture 14. Slot 14, shown as being generally oblong in shape, opens into a shallow cavity which is well adapted to receive the flanged portion of the bolt.

The handle attaching kit provided in accordance with the invention comprises a bolt 16 screw threaded along its length and having at one end an enlarged head 18 of generally circular shape which is of slightly less diameter than the long dimension of the oblong slot 14. In order to permit insertion of the bolt head 18 into the aperture, one side of the head 18 is slabbed off at 20 in a plane which is substantially normal to a line indicated as a dot-and-dash construction line 22 in FIGS. 3 and 4, which extends between the center of the slabbed off side to the intersection of said head 18 with the opposite side of the bolt, the depth of the slabbing off at 20 being gauged so that the length of said construction line 22 is less than the width of the slot 14 to permit the insertion of the flange through the aperture while swinging about said point of intersection as best shown in FIG. 4. It will be noted that the bolt is provided at its opposite end with a screw driver receiving slot 24. While a conventional slot 24 has been shown it will be understood that a recessed head of any description may be employed to accommodate a screw driver of any specified type.

There is also provided with applicant's handle attaching kit a sleeve nut 26 having a length greater than the length of the bolt and internally screw threaded for assembly with the bolt 16. With the construction shown the handle attaching kit is readily assembled on the supporting window panel as best shown in FIGS. 4 and 5. First the bolt is inserted in the tilted position shown in FIG. 4 and is then moved to an upright position and the sleeve nut 26 is threaded thereto. In order to tighten the parts firmly together with the sleeve nut 26 in the desired rotatably determined position to receive the handle thereon, a screw driver 28 is inserted through the open end of the nut 26 into engagement with the screw driver slot 24. The nut 26 is then turned to the desired angular position and held, while the bolt is rotated relatively to the nut, causing the parts of the post assembly to be firmly and permanently tightened in place.

In the preferred embodiment of the invention shown it is contemplated that a shim washer 29 may be interposed between the nut 26 and the window panel in order to control the tightened angular position of the bolt 16. For maximum holding power the slabbed off porton 20 of the head 18 should be placed across one end or the other of the oblong slot 14 when the post assembly is fully tightened. The shim washer 29 is employed where necessary to make the desired correction in the tightened angular position of the bolt.

The illustrated construction has the specific advantage that movement of the bolt 16 from a tilted to an upright position, has the effect of locking the bolt head 18 into the slotted aperture 14 for any rotational position of the bolt. The screw driver slot 24 recessed within the sleeve nut 26 provides a convenient means for rotating the bolt while the sleeve nut 26 is held stationary to permit tightening the post assembly in the desired angular position. Inasmuch as the handle generally indicated at 30 in FIG. 1 together with the specific means employed for mounting the handle on the post assembly are well known and form no part of the present invention any specific description thereof has been omitted.

The invention having been described what is claimed is:

1. For use with a basic part comprising a plate formed with a rectangularly slotted aperture of oblong shape opening into a cavity therebeneath, a handle attaching kit which comprises a bolt having a circular flange of less diameter than the long dimension of said slot with one side slabbed off at one side of the bolt in a plane substantially normal to a line from the center of said slabbed off side to the intersection of said flange with the opposite side of said bolt, the distance between said slabbed off side and said intersection being less than the width of said slot for the insertion of said flange through the aperture swinging about said point of intersection, said bolt having external screw threads along its length and a screw driver slot in the end thereof, and a sleeve nut threaded to and having a length greater than said bolt, adapted to be held during rotation of said bolt to tighten the held sleeve nut and bolt against said apertured plate.

2. A handle attaching kit according to claim 1 in which a shim washer is interposed between the sleeve nut and plate of a thickness gaged to locate the slabbed off portion of said bolt across one end of said oblong slot for the tightened angular position of the bolt.

References Cited in the file of this patent

UNITED STATES PATENTS

| | | |
|---|---|---|
| 2,379,752 | Schultz | July 3, 1945 |
| 2,388,658 | Pumphrey | Nov. 6, 1945 |

FOREIGN PATENTS

| | | |
|---|---|---|
| 1,075,977 | Germany | Feb. 18, 1960 |